United States Patent
Yu et al.

(10) Patent No.: US 8,487,887 B2
(45) Date of Patent: Jul. 16, 2013

(54) TOUCH DISPLAY DEVICE

(75) Inventors: Chia-Hsin Yu, Taipei County (TW); Chia-Yang Liu, Taipei (TW); Shao-Chung Huang, Taoyuan County (TW); Yao-Chi Liu, Miaoli County (TW)

(73) Assignee: Au Optronics Corporation, Hsinchu (TW)

( * ) Notice: Subject to any disclaimer, the term of this patent is extended or adjusted under 35 U.S.C. 154(b) by 541 days.

(21) Appl. No.: 12/564,926

(22) Filed: Sep. 23, 2009

(65) Prior Publication Data

US 2010/0238128 A1    Sep. 23, 2010

(30) Foreign Application Priority Data

Mar. 23, 2009  (TW) .............................. 98109392 A (51) Int. Cl.
*G06F 3/041* (2006.01)
(52) U.S. Cl.
USPC ......................................................... 345/173
(58) Field of Classification Search
None
See application file for complete search history.

(56) References Cited

U.S. PATENT DOCUMENTS 5,680,160 A * 10/1997 LaPointe ........................ 345/173
5,923,319 A *  7/1999 Bishop et al. .................. 345/175
7,974,082 B2 *  7/2011 Uchimi ...................... 361/679.21

FOREIGN PATENT DOCUMENTS

| TW | 512274  | 12/2002 |
| TW | 570239  | 1/2004  |
| TW | M313819 | 6/2007  |
| TW | M345293 | 11/2008 |

\* cited by examiner

*Primary Examiner* — K. Wong
(74) *Attorney, Agent, or Firm* — Jianq Chyun IP Office (57) ABSTRACT

A touch display device including a main frame, a display module, a first frame, a second frame, and a touch device is provided. The main frame has a vertical sidewall part and a horizontal extension part defining a display module holding space. The display module having a display panel and a backlight module is within the display module holding space. The first frame having a side-fixing portion contacting with the backlight module and having a panel disposing portion on which the display panel is disposed is within the display module holding space. The second frame having a bottom portion on a surface of the display panel, a top portion contacting the horizontal extension part of the metal frame, and a touch device disposing portion on which the touch device within the display module holding space is disposed is within the display module holding space.

21 Claims, 8 Drawing Sheets

TOUCH DISPLAY DEVICE

CROSS-REFERENCE TO RELATED APPLICATION

This application claims the priority benefit of Taiwan application serial no. 98109392, filed on Mar. 23, 2009. The entirety of the above-mentioned patent application is hereby incorporated by reference herein and made a part of specification.

BACKGROUND OF THE INVENTION

1. Field of the Invention

The present invention relates to a touch display device, and particularly relates to a touch display device capable of assembling a touch device within the structure of a display module.

2. Description of Related Art

With rapid developments and applications of the information technology, wireless mobile telecommunication, and information appliances, the input devices of many information products are changed from a traditional keyboard, a mouse and so forth to touch devices, so as to satisfy the requirements of convenience in carrying, light weight, and user-friendly operations.

At present, touch devices can be generally categorized into resistance touch panels, capacitance touch panels, sound wave touch panels, optical touch components, electromagnetic touch components, etc. Each of the aforementioned touch devices can be externally assembled with a display module. In other words, the touch device is assembled with the display module after the assembly of the display module is completed. At the end, the display module and the touch device are then wrapped by a case to be embellished.

However, since the touch device and the display module are assembled after individual assembly, the procedure of assembly is more complicated and the cost is higher. In addition, there are the problems of precision and alignment of the touch device and the display module during the assembly of the touch device and the display module.

SUMMARY OF THE INVENTION

As a result, the present invention provides a touch display device assembling a touch device within the structure of a display module.

The present invention provides a touch display device including a main frame, a display module, a first frame, a second frame and a touch device. The main frame includes a vertical sidewall part and a horizontal extension part to construct a display module holding space. The display module is within the display module holding space, wherein the display module includes a backlight module and a display panel. The first frame is within the display module holding space and includes a side-fixing portion and a panel disposing portion. The side-fixing portion contacts a sidewall of the backlight module. The panel disposing portion is extended to the top of the backlight module. The display panel is disposed on the panel disposing portion. The second frame is within the display module holding space and includes a bottom portion, a top portion, and a touch device disposing portion, wherein the bottom portion leans on a surface of the display panel, and the top portion contacts the horizontal extension part of the main frame. The touch device is within the display module holding space and disposed on the touch device disposing portion of the second frame.

The present invention further provides a touch display device including a main frame, a display module, a frame and a touch device. The main frame includes a vertical sidewall part and a horizontal extension part to construct a display module holding space. The display module is within the display module holding space, wherein the display module includes a backlight module and a display panel. The frame is within the display module holding space, and includes a panel disposing portion, a touch device disposing portion, and a connecting portion. The display panel is disposed on the panel disposing portion. The touch device disposing portion is disposed above the panel disposing portion and the display panel is sandwiched between the panel disposing portion and the touch device disposing portion. The connecting portion connects the panel disposing portion and the touch device disposing portion and includes a lower portion and an upper portion. The lower portion contacts a sidewall of the backlight module, and the upper portion contacts the horizontal extension part of the main frame. Additionally, the touch device is within the display module holding space and disposed on the touch device disposing portion of the frame. Based on the above, the display module and the touch device of the present invention are fixed by the same main frame. Since no additional main frame is needed for disposing the touch device, the cost of production is decreased, and the excellent alignment between the display module and the touch device is provided.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
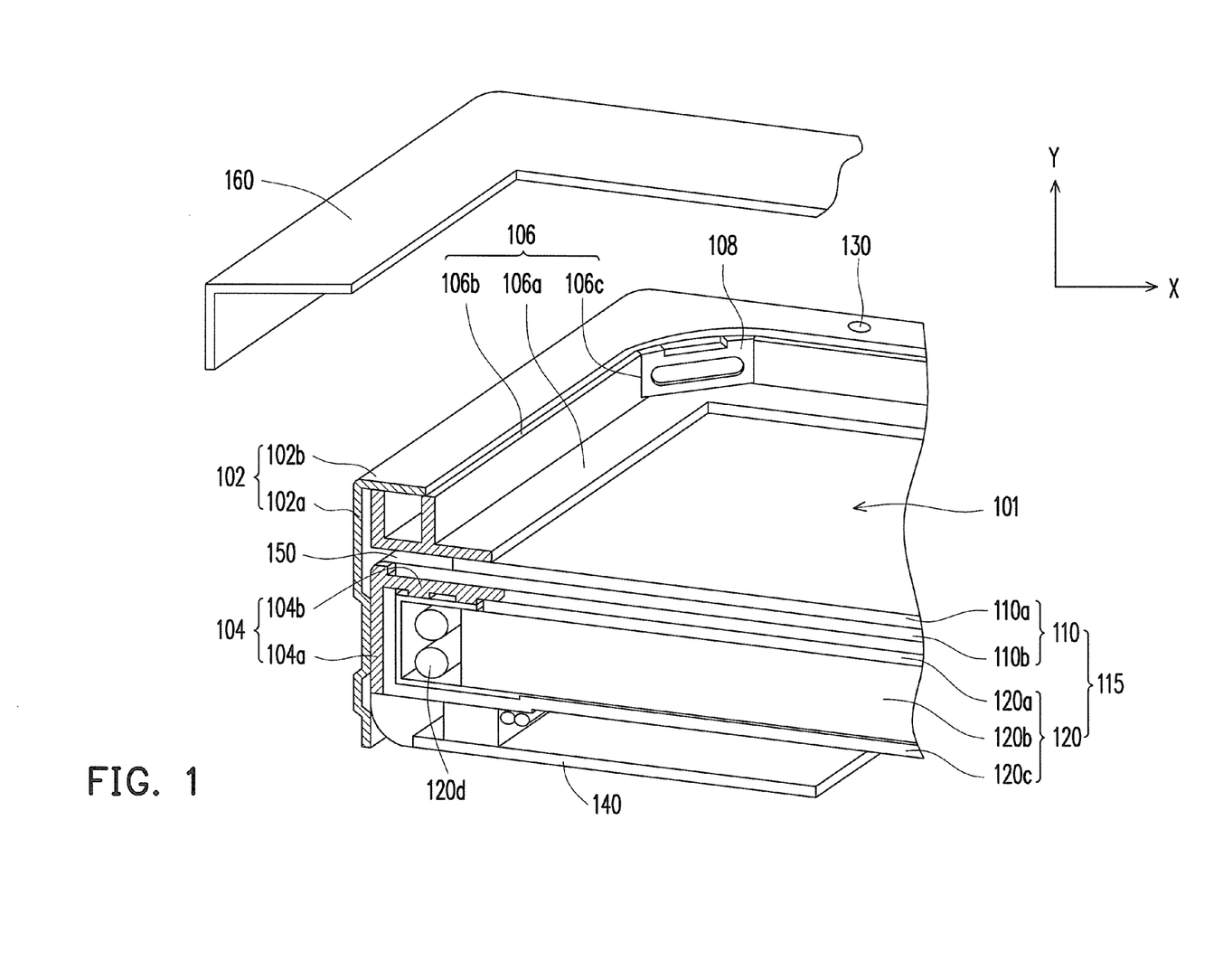
FIG. 1 is a schematic partial view of a touch display device according to an embodiment of the present invention.

FIG. 1 is a schematic partial view of a touch display device according an embodiment of the present invention. Please refer to FIG. 1. The touch display device of the present embodiment includes a main frame 102, a display module 115, a first frame 104, a second frame 106, and a touch device 108.

The main frame 102 is a metal frame, for example, and includes a vertical sidewall part 102a and a horizontal extension part 102b to construct a display module holding space 101. In the present embodiment, the metal frame 102 is a rectangular frame including four vertical sidewall parts 102a and the vertical sidewall parts 102a are disposed in parallel with the Y direction. In addition, the horizontal extension part 102b is connected with the vertical sidewall parts 102a and disposed in parallel with the X direction. More particularly, the horizontal extension part 102b is extended along the X direction from the top of the vertical sidewall parts 102a. The inner space formed by the vertical sidewall parts 102a and the horizontal extension part 102b within the metal frame 102 is defined as the display module holding space 101. In the present embodiment, the selected material for the metal frame 102 includes mainly light metal materials with enough mechanical strength, e.g. aluminum.

The display module 115 is within the display module holding space 101 defined by the vertical sidewall parts 102a and the horizontal extension part 102b of the metal frame 102. The display module 115 includes a display panel 110 and a backlight module 120. In particular, the horizontal extension part 102b of the metal frame 102 encircles the edge of the display panel 110.

In the present embodiment, the display panel 110 is constructed with an upper substrate 110a, a lower substrate 110b, and a display medium (not shown) sandwiched between the substrates 110a and 110b. If the display panel 110 is a liquid crystal display (LCD) panel, the upper substrate 110a can be a color filter substrate, the lower substrate 110b can be an active device array substrate, and the display medium can be a liquid crystal material, for example.

The backlight module 120 is disposed under the display panel 110. The backlight module 120 can be an edge type backlight module or a direct type backlight module. The present embodiment illustrates the edge type backlight module as an example for explanation, but the present invention is not limited thereto. In the present embodiment, the backlight module 120 includes an optical film set 120a, a light guiding plate 120b, a back plate 120c, and a light-emitting device 120d. The light-emitting device 120d is disposed at a side of the light guiding plate 120b. The drawings of the present embodiment illustrate a cold cathode lamp as an example of the light-emitting device 120d. However, the present invention is not limited thereto and the light-emitting device 120d can be other types of light-emitting device such as light emitting diodes (LED). In addition, the back plate 120c is disposed on a bottom portion and a side of the light guiding plate 120b so as to carry the light guiding plate 120b. A reflecting film (not shown) can further be disposed between the back plate 120c and the light guiding plate 120b. In addition, the optical film set 120a is disposed over the light guiding plate 120b (the light emitting surface). The optical film set 120a can include a brightness enhancement film, a diffusion film, and other optical films which can improve the luminescent quality of the backlight module 120.

The first frame 104 is a plastic frame, for example, and is within the display module holding space 101 and includes a side-fixing portion 104a and a panel disposing portion 104b.

In particular, the side-fixing portion 104a of the first plastic frame 104 contacts the sidewall of the backlight module 120. More particularly, the side-fixing portion 104a leans against the back plate 120c of the backlight module 120. Preferably, a fixing component (e.g. a lock component) is disposed between the side-fixing portion 104a of the first plastic frame 104 and the back plate 120c of the backlight module 120 to fix both together. In addition, the side-fixing portion 104a is also adjacent to the vertical sidewall part 102b of the main frame 102.

In addition, the panel disposing portion 104b of the first plastic frame 104 extends to the top of the backlight module 102, and the display panel 110 is disposed on the panel disposing portion 104b of the first plastic frame 104. In detail, the panel disposing portion 104b of the first plastic frame 104 is substantially perpendicular to the side-fixing portion 104a of the first plastic frame 104; that is to say, the panel disposing portion 104b extends toward the X direction from the top of the side-fixing portion 104a. Since the panel disposing portion 104b is for the disposition of the display panel 110, the lower substrate 110b of the display panel 110 leans on the surface of the panel disposing portion 104b. As a result, the panel disposing portion 104b of the first plastic frame 104 is sandwiched between the display panel 110 and the backlight module 120 and s certain gap is maintained between the display panel 110 and the optical film set 120a of the backlight module 120.

The second frame 106 is a plastic frame, for example, and is within the display module holding space 110 and includes a bottom portion 106a, a top portion 106b, and a touch device disposing portion 106c.

The bottom portion 106a of the second plastic frame 106 leans on the surface of the display panel 110. More particularly, the bottom portion 106a of the second plastic frame 106 contacts the upper substrate 110a of the display panel 110. As a result, the display panel 110 is sandwiched between the first plastic frame 104 and the second plastic frame 106. More specifically, the display panel 110 is sandwiched between the panel disposing portion 104b of the first plastic frame 104 and the bottom portion 106b of the second plastic frame 106.

In addition, the top portion 106b of the second plastic frame 106 contacts the horizontal extension part 102b of the metal frame 102. In other words, the horizontal extension part 102b of the metal frame 102 covers the top portion 106b of the second plastic frame 106. What should be noticed is that, on the premise of the second plastic frame 106 being capable of providing enough mechanical strength, a partial portion between the bottom portion 106a and the top portion 106b of the second plastic frame 106 is hollowed in the present embodiment to decrease the overall weight of the second plastic frame 106; therefore, the vertical cross section of the second plastic frame 106 is in a shape of letter "F". However, the present invention is not limited thereto. In other embodiments, the second plastic frame 106 can adopt other types of design of hollowing instead of the design of hollowing. Additionally, in the present embodiment, the width of the horizontal extension part 102b of the metal frame 102 is less than the width of the second plastic frame 106 in the X direction. More particularly, the width of the horizontal extension part 102b of the metal frame 102 is less than the width of the bottom portion 106a of the second plastic frame 106. Therefore, the metal frame 102 exposes a part of the second plastic frame 106. In the embodiment illustrated in FIG. 1, the horizontal extension part 102b of the metal frame 102 covers the top portion 106b of the second plastic frame 106. That is, the bottom portion 106a of the second plastic frame 106 is exposed.

What should be noticed is, in the present embodiment, the horizontal extension part 102b of the metal frame 102 is fixed with the second plastic frame 106 by a fixing component 130. More particularly, a tenon 130 can be used to shaft through the horizontal extension part 102b of the metal frame 102 and into the inner part of the second plastic frame 106 so as to fasten the horizontal extension part 102b of the metal frame 102 and the second plastic frame 106. However, in other embodiments, other fixing methods can also be used to fix the metal frame 102 and the second plastic frame 106. For example, an adhesive can be used to fix the horizontal extension part 102b of the metal frame 102 and the top portion 106b of the second plastic frame 106.

The touch device disposing portion 106c of the second plastic frame 106 is disposed between the bottom portion 106a and the top portion 106b of the second plastic frame 106. In the present embodiment, an optical touch device is used, and the touch device disposing portion 106c is designed in the corner of the second plastic frame 106 and disposed between the bottom portion 106a and the top bottom 106b, and the optical touch device is disposed on the touch device disposing portion 106c. Since the optical touch device is a commonly known touch device, the detailed components and operation principles thereof are not further explained here. Detailed description of the position of an optical touch device 108 within the second plastic frame 106 is given below.

Figure 2:
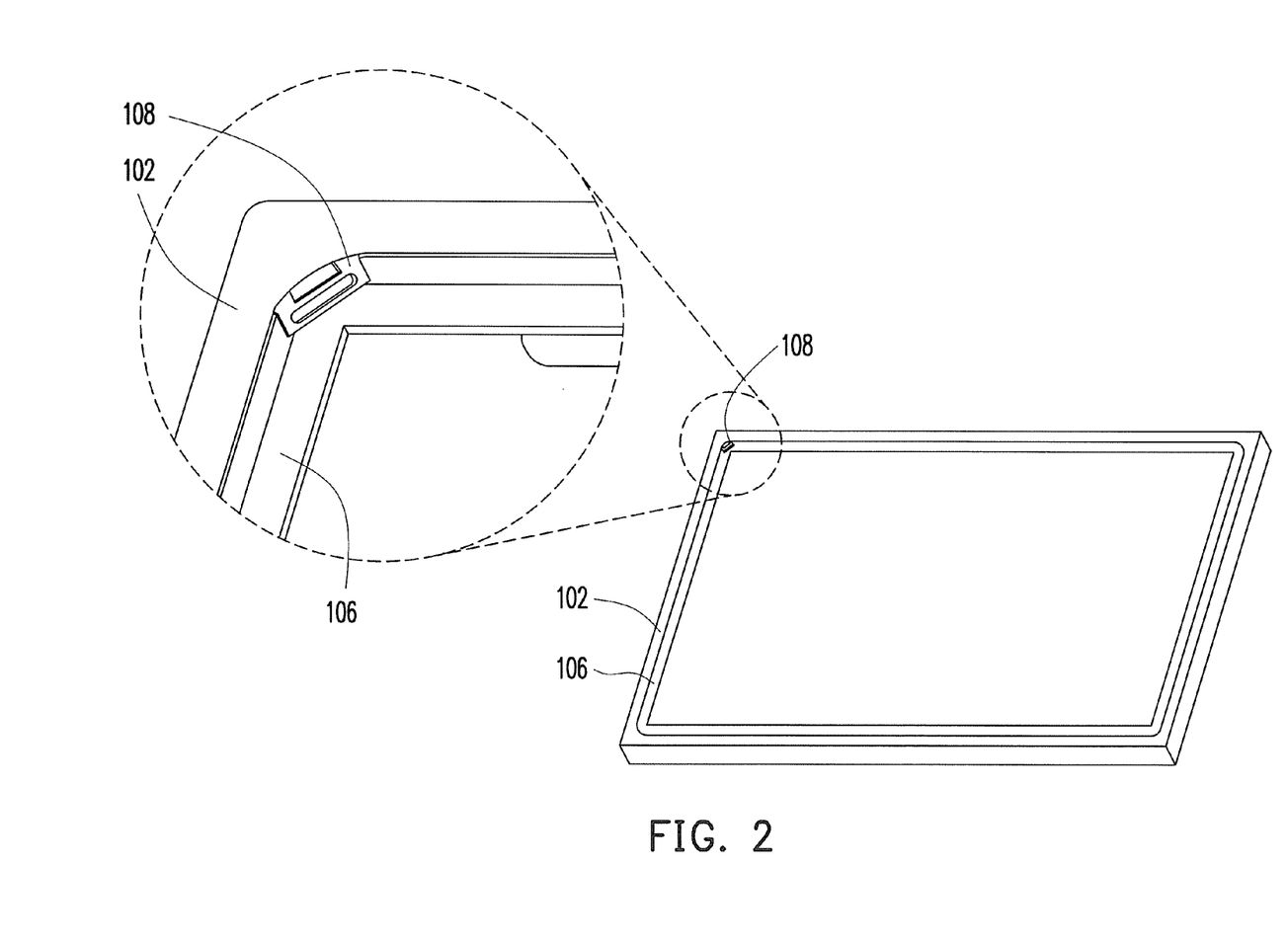
FIG. 2 is a schematic view of the position of a touch device of the touch display device in FIG. 1.
Figure 3A:
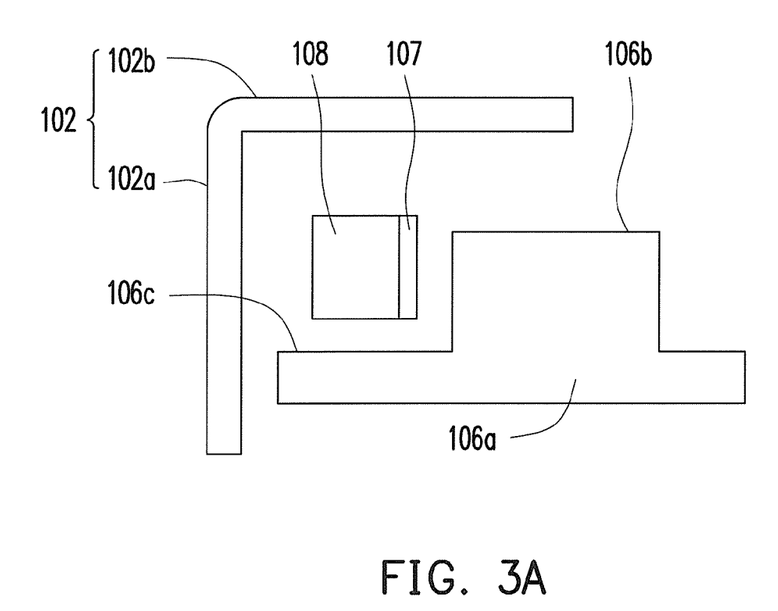
FIGS. 3A and 4A are respectively a side view and a 3D view of a second plastic frame without the disposition of an optical touch device.
Figure 3B:
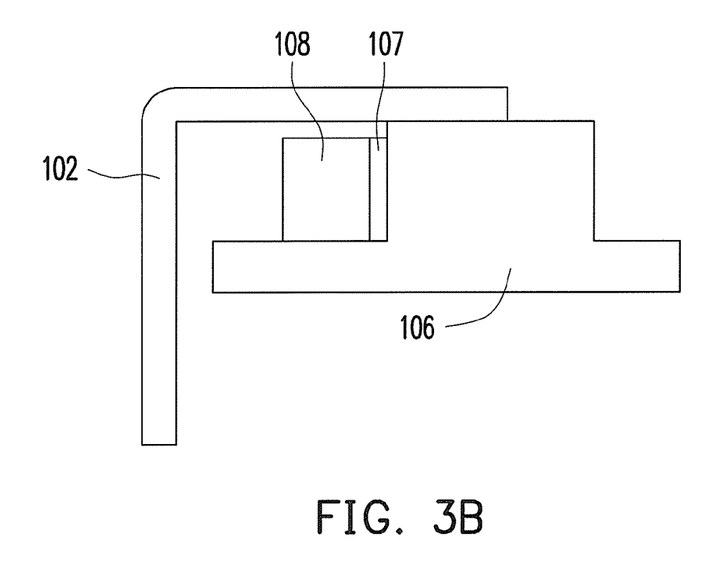
FIGS. 3B and 4B are respectively a side view and a 3D view of a second plastic frame disposed with an optical touch device.
Figure 4A:
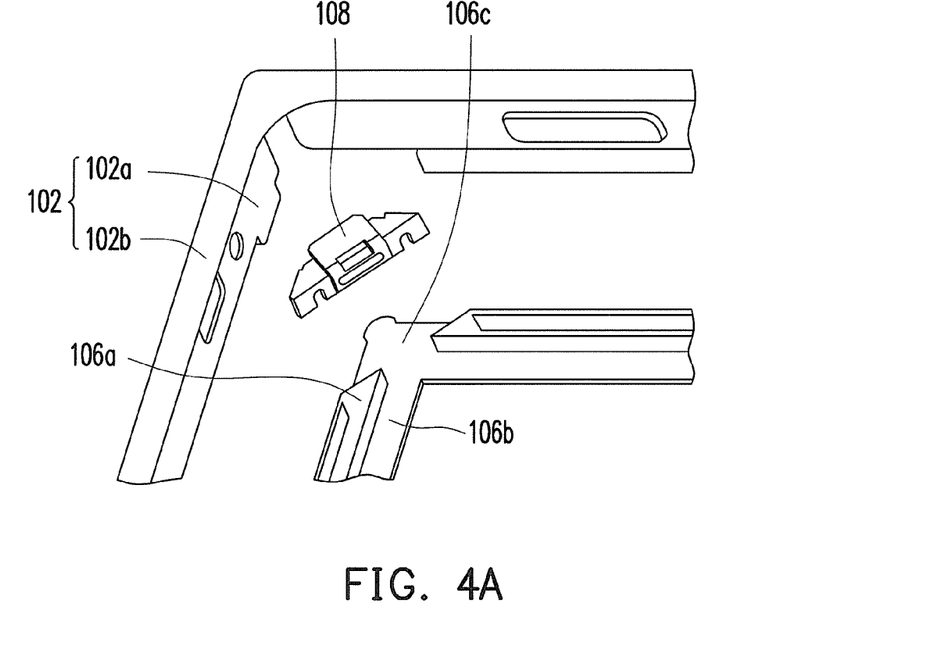
Figure 4B:
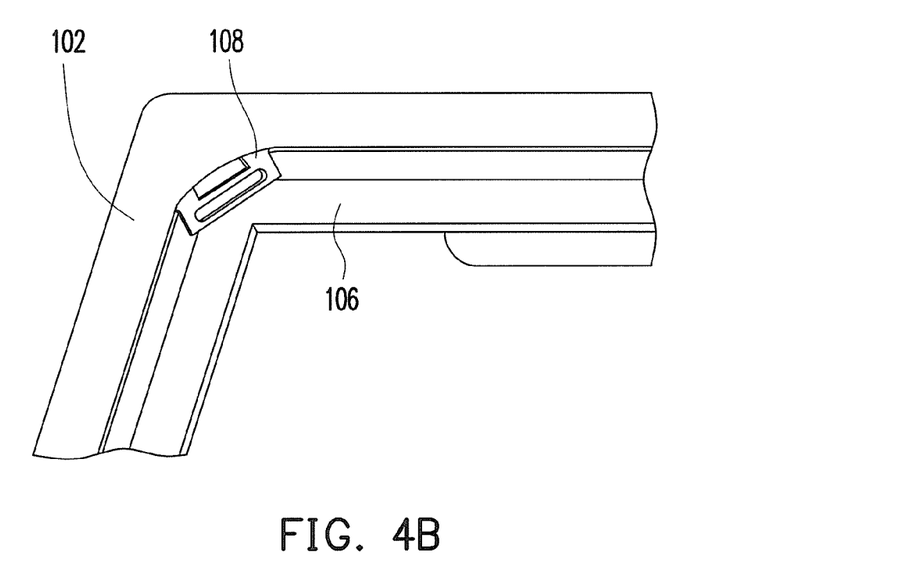

The optical touch device 108 is disposed in the corner of the second plastic frame 106, as shown in FIG. 2. The process of disposing the optical touch device 108 on the touch device disposing portion 106c of the second plastic frame 106 is shown as FIGS. 3A to 3B and 4A to 4B. FIGS. 3A and 4A are respectively a side view and a 3D view of the second plastic frame 106 without the disposition of the optical touch device 108. FIGS. 3B and 4B are respectively a side view and a 3D view of the second plastic frame 106 disposed with the optical touch device 108. Please refer to FIGS. 3A and 4A first. The touch device disposing portion 106c is disposed in the corner of the second plastic frame 106, and the optical touch device 108 is fixed on the touch device disposing portion 106c of the second plastic frame 106 though an adhesive 107. The adhesive 107 can be used between the sidewall of the optical touch device 108, the top portion 106b, and the bottom portion 106a of the second plastic frame 106. The adhesive 107 can also be used between the bottom portion of the optical touch device 108 and the bottom portion 106a of the second plastic frame 106. Next, please refer to FIGS. 3B and 4B. After the optical touch device 108 is fixed on the touch device disposing portion 106c of the second plastic frame 106, the metal frame 102 covers the top portion 106b of the second plastic frame 106.

Please refer to FIG. 1 again. The touch display device of the present embodiment can further include a circuit board 140 and a flexible circuit board 150 besides the aforementioned components. The circuit board 140 is within the display module holding space 101 and disposed under the backlight module 120. The flexible circuit board 150 is within the display module holding space 101 and connects the circuit board 140 and the display panel 110. More particularly, the flexible circuit board 150 electrically connects the circuit board 140 and the lower substrate 110b of the display panel 110 so that signals from the circuit board 140 enter the display panel 110 through the flexible circuit board 150, and the display of the display panel 110 is further controlled. The bottom of the backlight module 120 can be designed with other circuit components (not shown) electrically connecting the backlight module 120 and the circuit board 150.

The aforementioned components are disposed within the display module holding space 101. After the display module 115 and the touch device 180 are both completely installed within the display module holding space 101, the outermost peripheral areas can be further installed with a case 160. The case 106 covers the metal frame 102 so as to conceal the metal frame 102 and the second plastic frame 106 and expose the display area of the display panel 110. The case 160 can protect and beautify the touch display device. Therefore, a designer can embellish the case 160.

In the embodiment of FIG. 1, the optical touch device is used as an example of the touch display device. However, the present invention is not limited to the usage of the optical touch device. Other types of touch devices can also be used in other embodiments. Take an infrared rays (IR) touch device for example. The IR touch device senses the touched position by being installed with an IR emitter and receiver on the display panel. Therefore, if the IR touch device is used as the touch device, the IR emitter and receiver can be installed on the second plastic frame 160 shown in FIG. 1. But the positions of the IR emitter and receiver are slightly different from the position of the optical touch device mentioned in the embodiment. The IR emitter and receiver are not disposed in the corner of the second plastic frame 160 but on the four sides of the second plastic frame 160. Therefore, the touch device disposing portion 160c of the second plastic frame 160 is also disposed on the four sides of the second plastic frame 160. The process of installation of the IR touch device is more or less the same as that of the optical touch device. The difference lies in that the former is disposed on the sides of the second plastic frame while the latter is disposed in the corner of the second plastic frame. Therefore, persons of ordinary skill in the art can understand the installation process of the IR touch device according to the explanation of the embodiment of FIG. 1.

For touch display devices in other embodiments, a board-shaped touch device can also be adopted. The board-shaped touch device, such as a capacitance touch panel, a resistance touch panel or a sound wave touch device, is explained in detail in the following embodiment.

Figure 5A:
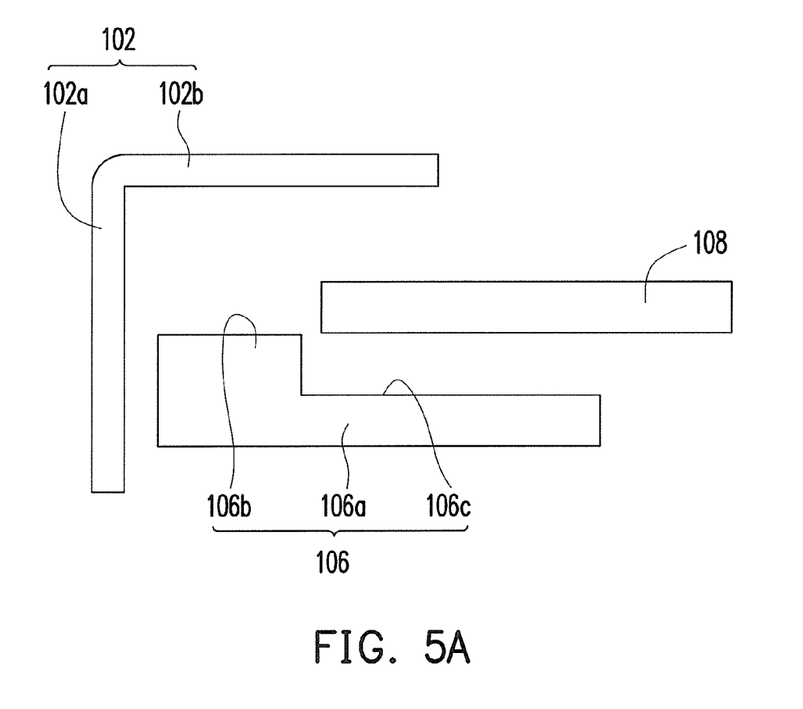
FIGS. 5A and 6A are respectively a side view and a 3D view of a second plastic frame without the disposition of a board-shaped touch device.
Figure 5B:
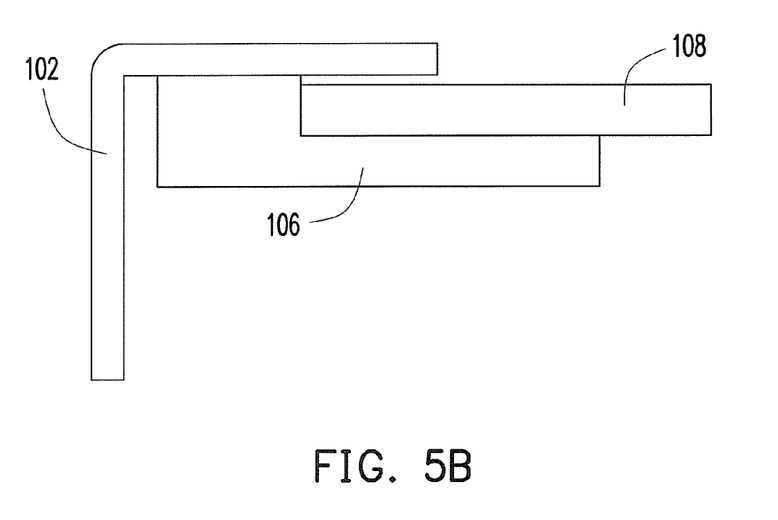
FIGS. 5B and 6B are respectively a side view and a 3D view of a second plastic frame disposed with a board-shaped touch device.
Figure 6A:
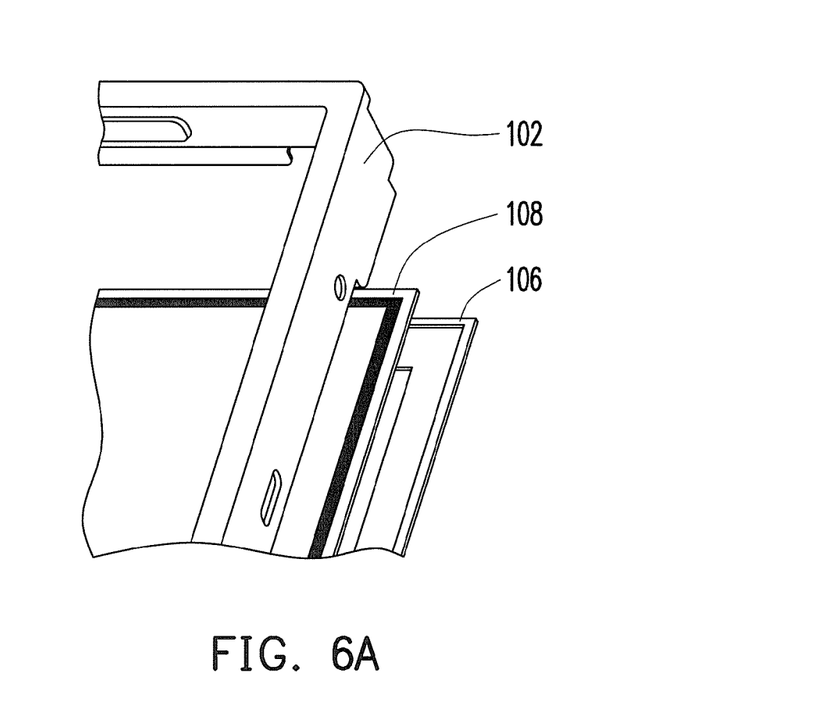
Figure 6B:
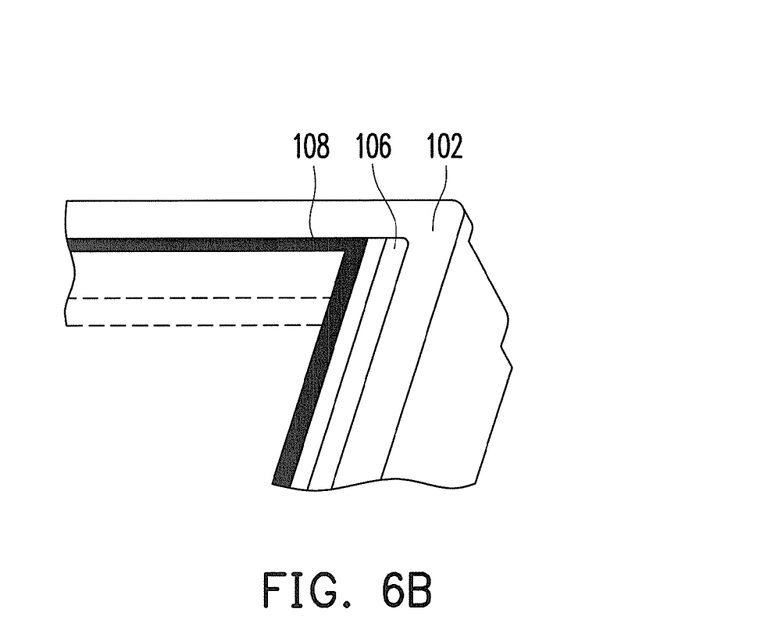

The structure described in the following embodiment is similar to the structure described in the embodiment as depicted in FIG. 1. The only difference is the usage of the board-shaped touch device. Therefore, except for corresponding changes of the design of the touch device disposing portion of the second plastic frame, other components are the same as those in FIG. 1. In the explanation of the following embodiment, components in accordance with those in FIG. 1 will be denoted with the same numerals and not repeated. FIGS. 5A and 5A are respectively a side view and a 3D view of the second plastic frame without the disposition of the board-shaped touch device. FIGS. 6B and 6B are respectively a side view and a 3D view of the second plastic frame disposed with the board-shaped touch device.

The following explanations are only in connection with the metal frame, the second plastic frame and the board-shaped touch device. Other components the same as those in FIG. 1 such as the display panel, the backlight module and the first plastic frame, etc., are not repeated here. Please refer to FIGS. 5A and 6A first. The touch device disposing portion 106c of the second plastic frame 106 is disposed between the top portion 106b and the bottom portion 106a of the second plastic frame 106 and is disposed on the entire side of the second plastic frame 106. The board-shaped touch device 108 can be fixed on the touch device disposing portion 106c of the second plastic frame 106 by an adhesive (not shown). Next, please refer to FIGS. 5B and 6B. After the board-shaped touch device 108 is fixed on the touch device disposing portion 106c of the second plastic frame 106, the metal frame 102 covers the top portion 106b of the second plastic frame 106.

In the embodiment, the first plastic frame and the second plastic frame of the touch display device are two individual components. However, the present invention is not limited thereto. In other embodiments, the first plastic frame and the second plastic frame of the touch display device can also be integrated. The detailed description is given as follows.

Figure 7:
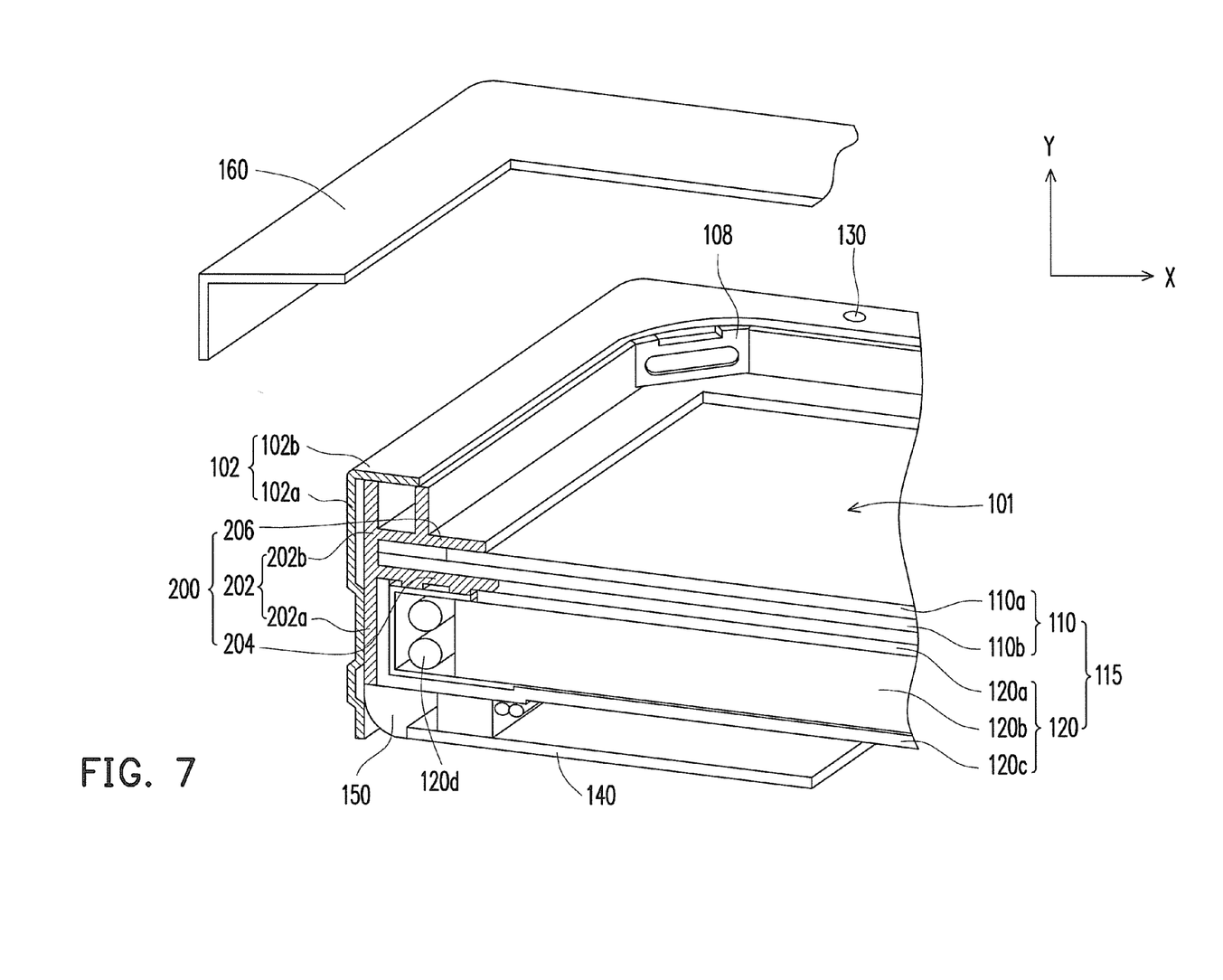
FIGS. 7 and 8 respectively show the schematic partial view of the touch display device according to an embodiment of the present invention.

FIG. 7 is a schematic view of a touch display device according to another embodiment of the present invention. Please refer to FIG. 7. The structure in the embodiment illustrated in FIG. 7 is similar to the structure in the embodiment of FIG. 1. The difference is the design of the frame. Thus, in the explanation of the following embodiment, components identical to those of FIG. 1 will be denoted with the same numerals and not repeated. In the embodiment of FIG. 7, a frame 200, which is a plastic frame for example, is within the display module holding space 101, and the plastic frame 200 includes a connecting portion 202, a panel disposing portion 204, and a touch device disposing portion 206. The connecting portion 202 includes a lower portion 202a and an upper portion 202b and the connecting portion 202 of the plastic frame 200 leans on the vertical sidewall part 102a of the metal frame 102. More specifically, the lower portion 202a of the connecting portion 202 contacts the sidewall of the backlight module 120, and the upper portion 202b of the connecting portion 202 contacts the horizontal extension part 102b of the metal frame 102. Both of the panel disposing portion 204 and the touch device disposing portion 206 connect with the connecting portion 202, and the touch device disposing portion 206 is disposed on the panel disposing portion 204. The display panel 110 is disposed on the panel disposing portion 204, and the display panel 110 is sandwiched between the panel disposing portion 204 and the touch device disposing portion 206.

Similarly, in the embodiment of FIG. 7, the optical touch device is used as an example of the touch display device. However, the present invention is not limited to the usage of the optical touch device. Other types of touch devices such as an IR touch device or a board-shaped touch device can also be used in other embodiments. The board-shaped touch device, for example, is a capacitance touch panel, a resistance touch panel, or a sound wave touch device. The touch device disposing portion 206 of the plastic frame 200 is changed correspondingly according to different touch devices. The process of the changes is the same as that of the previous embodiment and not repeated here.

Figure 8:
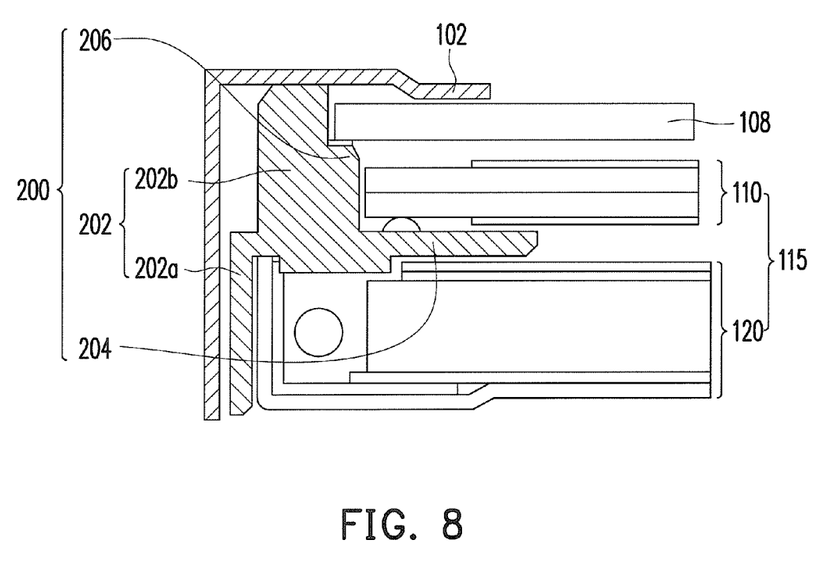

FIG. 8 is a schematic view of a touch display device according to another embodiment of the present invention. A touch display device of FIG. 8 is similar to that of FIG. 7. The subtle differences are the connecting portion 202 and the touch device disposing portion 206 of the plastic frame 200. In the embodiment of FIG. 8, the upper portion 202b of the connecting portion 202 of the plastic frame 200 is not designed as being hollowed and the touch device disposing portion 206 of FIG. 8 is designed for the installation of a board-shaped touch device (such as a capacitance touch panel, a resistance touch panel, or a sound wave touch device).

For the touch display devices in each of the embodiments, the touch device and the display module are installed together within the display module holding space defined by the metal frame. Therefore, the display module and the touch device are fixed by the same metal frame. Since no additional metal frame is needed for the touch device, the cost of production of the display device is decreased. In addition, since the display module and the touch device are assembled by the same metal frame, the present invention is more capable of providing the excellent alignment between the display module and the touch device compared with the traditional method of assembling the display module and the touch device individually and then assembling them together.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch display device, comprising:
   a main frame comprising a vertical sidewall part and a horizontal extension part to construct a display module holding space;
   a display module within the display module holding space, wherein the display module comprises a backlight module and a display panel;
   a first frame within the display module holding space, the first frame comprising a side-fixing portion and a panel disposing portion, the side-fixing portion contacting a sidewall of the backlight module, the panel disposing portion extending to the top of the backlight module, the display panel disposed on the panel disposing portion;
   a second frame within the display module holding space, the second frame comprising a bottom portion, a top portion, and a touch device disposing portion, wherein a gap is between a top surface of the top portion and a bottom surface of the bottom portion along a vertical direction, the touch device disposing portion is disposed in the gap between the top portion and the bottom portion, the bottom portion leans on a surface of the display panel, and the top portion contacts the horizontal extension part of the main frame, such that the horizontal extension part of the main frame and the display panel are spearated from each other through the second frame; and
   a touch device disposed within the display module holding space and disposed on the touch device disposing portion of the second frame, such that the touch device is disposed in the gap and between the the touch device disposing portion and the top portion along the vertical direction.

2. The touch display device according to claim 1, wherein the display panel is sandwiched between the first frame and the second frame.

3. The touch display device according to claim 2, wherein the display panel is sandwiched between the panel disposing portion of the first frame and the bottom portion of the second frame.

4. The touch display device according to claim 1, further comprising a fixing component disposed between the horizontal extension part of the main frame and the second frame.

5. The touch display device according to claim 1, wherein the backlight module comprises a back plate and a light-emitting device installed within the back plate, and the side-fixing portion of the first frame is installed on the back plate.

6. A touch display device according to claim 1, wherein the touch device comprises a capacitance touch panel, a resistance touch panel, a sound wave touch device, an infrared rays touch device, or an optical touch device.

7. The touch display device according to claim 1, further comprising:
   a circuit board within the display module holding space and disposed under the backlight module; and
   a flexible circuit board within the display module holding space and connecting the circuit board and the display panel.

8. The touch display device according to claim 1, further comprising a case wrapping the main frame to cover the main frame and the second frame.

9. The touch display device according to claim 1, wherein the horizontal extension part of the main frame encircles the edge of the display panel.

10. The touch display device according to claim 1, wherein the side-fixing portion is adjacent to the vertical sidewall part of the main frame.

11. The touch display device according to claim 1, wherein the main frame is a metal frame, and the first and second frames are respectively a plastic frame.

12. The touch display device according to claim 1, wherein the second frame has a plurality of corners, and the touch device is disposed at least one of the corners.

13. A touch display device, comprising:
- a main frame comprising a vertical sidewall part and a horizontal extension part to construct a display module holding space;
- a display module within the display module holding space, wherein the display module comprises a backlight module and a display panel; and
- a frame within the display module holding space, the frame comprising:
  - a panel disposing portion on which the display panel is disposed;
  - a touch device disposing portion disposed above the panel disposing portion, the display panel sandwiched between the panel disposing portion and the touch device disposing portion;
  - a connecting portion connecting the panel disposing portion and the touch device disposing portion, the connecting portion comprising a lower portion and an upper portion, the lower portion contacting a sidewall of the backlight module and the upper portion contacting the horizontal extension part of the main frame, wherein a gap is between a top surface of the upper portion and the touch device disposing portion along a vertical direction, the touch device disposing portion is disposed on a surface of upper poertion near the horizontal extension part of the main frame, and the horizontal extension part of the main frame and the display panel are spearated from each other through the frame; and
  - a touch device within the display module holding space and disposed on the touch device disposing portion of the frame, such that the touch device is disposed in the gap and between the the touch device disposing portion and the upper portion of the connecting portion along the vertical direction.

14. The touch display device according to claim 13, further comprising a fixing component disposed between the horizontal extension part of the main frame and the frame.

15. The touch display device according to claim 13, wherein the backlight module comprises a back plate and a light-emitting device installed within the back plate, and the lower portion of the connecting portion of the frame is installed on the back plate.

16. The touch display device according to claim 13, wherein the touch device comprises a capacitance touch panel, a resistance touch panel, a sound wave touch device, an infrared rays touch device, or an optical touch device.

17. The touch display device according to claim 13, further comprising:
- a circuit board within the display module holding space and disposed under the backlight module; and
- a flexible circuit board within the display module holding space and connecting the circuit board and the display panel.

18. The touch display device according to claim 13, further comprising a case wrapping the main frame to cover the main frame and the frame.

19. The touch display device according to claim 13, wherein the horizontal extension part of the main frame encircles the edge of the display panel.

20. The touch display device according to claim 13, wherein the main frame is a metal frame, and the frame is a plastic frame.

21. The touch display device according to claim 13, wherein the frame has a plurality of corners, and the touch device is disposed at least one of the corners.

* * * * *